Patented May 18, 1926.

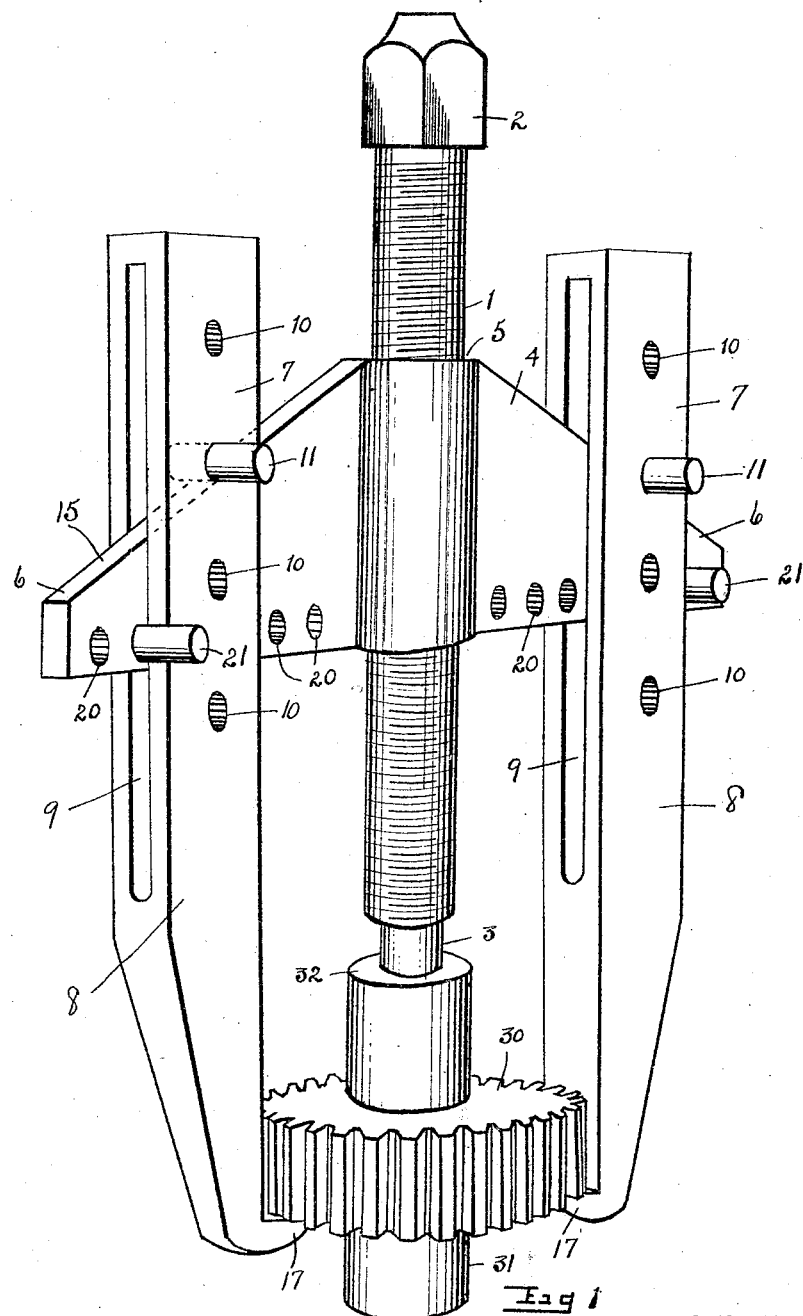

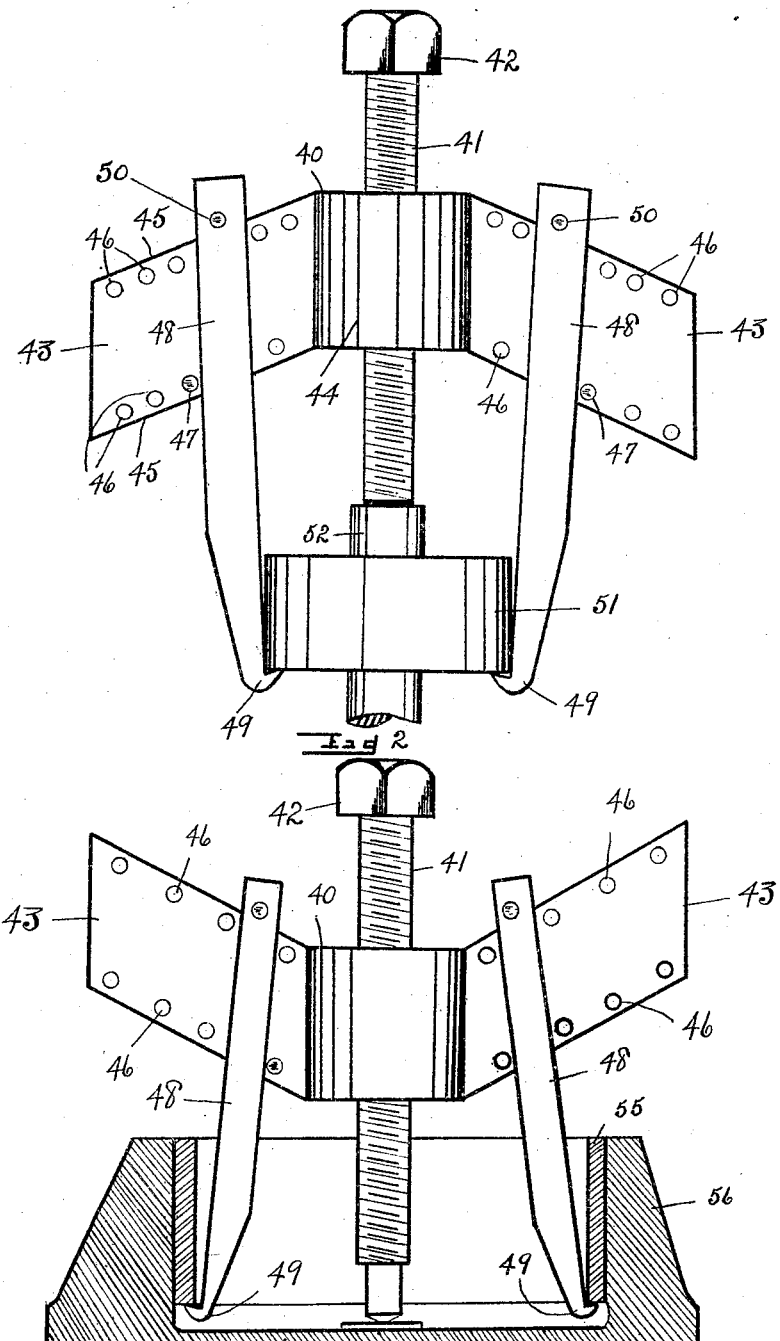

1,584,855

UNITED STATES PATENT OFFICE.

FREDERICK G. EISENHUTH, OF UTICA, NEW YORK.

GEAR OR PULLEY REMOVING TOOL.

Application filed August 23, 1924. Serial No. 733,710.

My invention relates to a gear or pulley removing tool and I declare the following to be a full, clear, concise and exact description thereof sufficient to enable anyone skilled in the art to which it appertains to make and use the same, reference being had to the accompanying drawings in which like reference characters refer to like parts throughout the specifications.

The object of the invention is to provide a tool adapted for pulling a tight fitting gear or pulley off from a shaft. The device will be found useful also in pulling an automobile wheel from its axle and in various other ways.

The object will be understood by referring to the drawings in which:

Fig. 1 is a perspective view of the device.

Fig. 2 is a modification showing an elevation.

Fig. 3 is another view of the modification showing an elevation with parts in reversed position.

Referring more particularly to the device a screw bolt is represented by 1. Bolt 1 has an angular faced head 2 and reduced lower end 3. A yoke 4 having a socket 5 and wings 6, 6 is mounted to travel on bolt 1. Wings 6, 6 are narrow in thickness and taper downward. The upper parts 7, 7 of jaws 8, 8 are in each instance slotted at 9, whereby to allow for the projection of wings 6, 6 therethrough. Each of the slots 9 is made sufficiently long to allow for the movement of the upper parts of jaws 8, 8 towards and away from each other.

Furthermore, each of the parts 7 of jaws 8, is equipped with apertures 10, adapted for the removable disposition of adjustable pins 11, which pass through the part 7 and bridge the recess 9, whereby they will rest on the upper sloping edges 15, 15 of wings 6, 6 and cause the lower parts, having hooks 17, 17 of jaws 8, 8 to move towards each other when the yoke 4 travels outward on bolt 1. Apertures 20 are made in the lower edge of wings 6, 6 for the disposition of adjustable pins 21, 21 that cooperate with pins 11 to hold hooks 17 in given relation to an object, such as a gear 30.

The operation of the device is effected to pull, for instance, gear 30 off from shaft 31 to which it has a tight fit, by first adjusting pins 11 and 21 to the proper apertures 10 in wings 6 and 20 in jaws 8 respectively to accommodate the tool to the task at hand. The device will be placed then with hooks 17 of jaws 8 engaging gear 30 at diametrically opposite locations thereof and with the reduced end 3 of bolt 1 resting against the end 32 of shaft 31. Head 2 will be engaged by a wrench, not shown, and turned, whereupon yoke 4 will travel towards head 2. As yoke 4 thus travels, the upper parts 7 of jaws 8 will be forced outward by the edges 15 of wings 6, contacting with pins 11 and hooks 17 forced inward, whereby to assure a firm grip on gear 30.

Figs. 2 and 3 show a modification. Here yoke 40 screw mounted to screw bolt 41 having an angular faced head 42, is provided with wings 43, 43 that are disposed at an angle to bushing 44 containing a screw threaded aperture for the projection of screw bolt 41. Edges 45, 45 of each of the wings 43 are parallel to each other. Each of the wings 43 is equipped with a plurality of holes 46 located adjacent edges 45, 45. Holes 46 are adapted for the disposition of adjustable pins 47, 47 one being disposed in each wing 43, whereby to aid in holding the upper parts 48 of hooks 49 from slipping off wings 43 when the yoke is in the position illustrated in Fig. 2. Pins 50 disposed through upper parts 48 of hooks 49 cooperate with pins 47 to hold hooks 49 in given relation to each other, whereby said hooks 49 will be forced towards each other to firmly grip pulley 51, as yoke 40 travels towards head 42 to pull pulley 51 off shaft 52. Parts 48 are equipped with recesses, as in the former construction for the projection of wings 43, 43 therethrough.

Fig. 3 shows yoke 40 reversed, whereby the hooks 49 can be used to secure a firm hold from the interior to withdraw an object, such as a ring 55 that has a tight fit within a hub or other member 56.

Having thus described my invention what I claim is new and desire to secure by Letters Patent is:

1. In a gear or pulley removing tool, a bolt, a yoke having beveled sides and mounted to travel on said bolt, and jaws having slots mounted to travel on the beveled sides of said yoke, whereby the movement of said yoke will impart a movement of said jaws to aid in withdrawing an object from a shaft.

2. In a gear or pulley removing tool, a bolt, a yoke having beveled sides mounted on said bolt, traveling jaws having slots therein, whereby to be mounted on said yoke, and means carried by said yoke, whereby to limit the motion of said jaws.

3. In a gear or pulley removing tool, a bolt, a yoke having beveled sides mounted on said bolt, traveling jaws having slots therein, whereby to be mounted on said yoke, means carried by said yoke, whereby to limit the motion of said jaws, and other means mounted in said jaws, whereby to aid in forcing the lower ends of said jaws toward each other.

4. In a gear or pulley removing tool, a bolt, a yoke having beveled sides mounted to travel on said bolt, jaws having slots therein, whereby to travel on said yoke, pins mounted in said yoke, whereby to limit the motion of said jaws, and other pins mounted in said jaws, whereby to aid in forcing the lower ends of said jaws toward each other.

5. In a gear or pulley removing tool, a bolt, a yoke adapted to travel on said bolt, wings with beveled edges formed on said yoke, jaws having slots therein to receive said wings, there being apertures formed in said wings, pins adapted to engage said apertures, whereby to limit the motion of said jaws, there being other apertures formed in said jaws, and pins adapted to engage said last named apertures, whereby to aid in forcing the lower ends of said jaws toward each other.

In testimony whereof he affixes his signature.

FREDERICK G. EISENHUTH.